United States Patent [19]
Huber

[11] Patent Number: 5,191,586
[45] Date of Patent: Mar. 2, 1993

[54] NARROW BAND INCOHERENT OPTICAL CARRIER GENERATOR

[75] Inventor: David R. Huber, Warrington, Pa.

[73] Assignee: General Instrument Corporation, Hatboro, Pa.

[21] Appl. No.: 732,097

[22] Filed: Jul. 18, 1991

[51] Int. Cl.[5] .............................................. H01S 3/30
[52] U.S. Cl. ........................................ 372/6; 372/19; 372/102; 372/70; 359/341
[58] Field of Search ...................... 372/6, 19, 70, 102; 385/15, 22, 37, 39; 359/341

[56] References Cited

U.S. PATENT DOCUMENTS

| | | | |
|---|---|---|---|
| 4,938,556 | 7/1990 | Digonnet et al. | 372/69 |
| 4,962,995 | 10/1990 | Andrews et al. | 372/6 |
| 5,048,913 | 9/1991 | Glenn et al. | 385/37 |
| 5,050,949 | 9/1991 | DiGiovanni et al. | 385/27 |
| 5,134,620 | 7/1992 | Huber | 372/6 |
| 5,140,456 | 8/1992 | Huber | 372/6 |

Primary Examiner—Leon Scott, Jr.
Attorney, Agent, or Firm—Barry R. Lipsitz

[57] ABSTRACT

A narrow bandwidth incoherent optical source is provided. A superluminescent source includes a gain medium having an input end and an output end. The input end of the gain medium is optically coupled to a reflector to cause spontaneous emissions within a predetermined band exiting the input of the gain medium to be reflected back into the medium. Spontaneous emissions outside of the predetermined band are lost. The gain medium can comprise a doped fiber, such as an Erbium doped fiber. An optical isolator prevents the superluminescent source from lasing. By providing a plurality of reflectors operating in different bands, the superluminescent source can generate a plurality of optical carriers.

21 Claims, 2 Drawing Sheets

NARROW BAND INCOHERENT OPTICAL CARRIER GENERATOR

BACKGROUND OF THE INVENTION

The present invention relates to optical communication systems, and more particularly to a narrow band incoherent superluminescent source useful for providing optical carriers.

The optical communications field is expanding at a rapid pace. Telecommunication, sensors, medical and video transmission can all take advantage of optical technology, particularly where virtually unlimited bandwidth and low attenuation are beneficial. Cable television systems are one example where optical fiber technology is providing efficient and economical alternatives to prior coaxial cable distribution schemes.

Fiber optic communication systems which utilize direct detection of information signals that are modulated on a carrier do not require a coherent light source such as that produced by a laser. Lasers are used, however, because they are readily available and provide a convenient source of high intensity light. However, lasers tend to be expensive and have various operational drawbacks that render them less than optimum for use in the field Other light sources, such as the light emitting diode (LED) and the superluminescent diode (SLD) have shown promise as carrier generators for fiber transmission. A basic measure of the usefulness of such incoherent sources for optical communication applications is the radiance (or brightness) of the source as measured in watts of optical power radiated into a unit solid angle per unit area of the emitting surface. To be useful for fiber transmission applications, an incoherent light source must have a high radiance and operate with a narrow bandwidth. Although LEDs and SLDs are known with relatively high radiance parameters, narrow spectral widths of about 1 angstrom (Å) have not previously been disclosed.

When both spontaneous and stimulated emission occur in an LED, its output can be of narrower spectral width and higher radiance than if spontaneous emission alone exists. Such "superluminescent" devices have achieved spectral widths of 20 Å under pulsed operation with a very high pulsed driving current. SLDs with narrower spectral widths are not currently available.

It would be advantageous to provide an incoherent light source for use in fiber optic communication systems that is economical and reliable. It would be further advantageous to provide a superluminescent light source for such purposes, having a narrow line width of about 1 Å. Such a light source should be capable of providing a plurality of optical carriers for use in transmitting separate information signals over an optical communication path.

The present invention provides a narrow band incoherent optical source having the above-mentioned advantages.

SUMMARY OF THE INVENTION

In accordance with the present invention, a narrow band incoherent optical carrier generator is provided for use in optical communication systems or the like. A superluminescent source includes a gain medium having an input end and an output end. Reflector means are provided for reflecting energy within a predetermined narrow band. Means are provided for optically coupling the input end of the gain medium to the reflector means to cause spontaneous emissions within the predetermined band exiting the input of the gain medium to be reflected back into the medium. At the same time, spontaneous emissions outside of the predetermined band are not reflected back into the gain medium.

The optical carrier generator of the present invention can comprise optical isolator means coupled to the output end of the gain medium for preventing the medium from lasing. In a preferred embodiment, the reflector means comprise an optical fiber grating. Means, such as an optical coupler, are coupled to the grating to cause spontaneous emissions outside of the predetermined band that exit the input of the gain medium to leave the optical carrier generator.

In the illustrated embodiment, the gain medium comprises a pumped doped optical fiber, such as an Erbium doped fiber. The doped optical fiber can be pumped at one or both of its input and output ends.

Carrier signals generated by the optical carrier generator can be input to an external optical modulator used to modulate an information signal onto the carrier. Some types of external modulators require the carrier to comprise polarized light. In such instances, the optical carrier generator of the present invention can be configured to provide polarized light. In one embodiment, means operatively associated with the doped fiber are provided for polarizing energy produced therein prior to output from the output end of the gain medium. In another embodiment, separate polarizing means are coupled to the output of the gain medium for polarizing energy exiting the output end for input to an external modulator.

In some applications, it is preferable to filter the spontaneous emissions that exit the superluminescent source of the present invention. In such applications, filter means are coupled to the output end of the gain medium for eliminating spontaneous emissions outside of the predetermined band that exit from the output end.

An optical carrier generator in accordance with the present invention can utilize reflector means that comprise a plurality of different reflectors, each adapted to reflect spontaneous emissions within a different predetermined narrow band back into the gain medium. In this manner, a plurality of separate carriers can be provided for carrying a plurality of different information signals over the optical communication path. In such an embodiment, demultiplexer means are coupled to the output end of the gain medium for providing the plurality of separate carriers, each having a wavelength within a different one of the predetermined bands. In an illustrated embodiment, the reflector means comprise a plurality of optical fiber gratings.

The present invention also provides a method for communicating signals over an optical fiber communication path. An incoherent optical carrier is generated in a superluminescent source. The carrier is limited to a narrow bandwidth, and amplified within the source. The amplified carrier is then modulated with an information signal for communication over the communication path.

In the method of the present invention, the limiting step can comprise the steps of reflecting spontaneous emissions within the narrow bandwidth that exit an input end of a gain medium of the superluminescent source back into the gain medium, and discarding spontaneous emissions outside of the narrow bandwidth that exit the input end. A plurality of different incoherent optical carriers is generated by reflecting spontaneous emissions within a corresponding plurality of different bands back into the input end of said gain medium while discarding spontaneous emissions outside of the plurality of bands. Energy exiting an output end of the gain medium is demultiplexed to provide individual optical carriers, and the individual carriers are modulated with respective information signals.

DETAILED DESCRIPTION OF THE INVENTION

Figure 1:
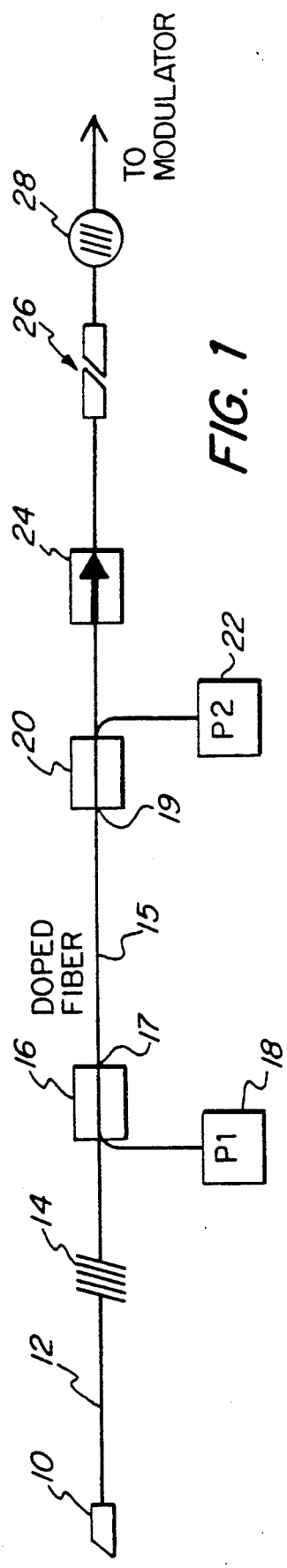
FIG. 1 is a schematic diagram of a narrow band incoherent superluminescent source in accordance with the present invention.

A schematic diagram of a narrow band superluminescent source that provides an incoherent optical carrier in accordance with the present invention is illustrated in FIG. 1. A gain medium comprising a doped fiber 15 is pumped at an input end 17 thereof by a first pump laser 18 via a pump signal multiplexer 16. In the illustrated embodiment, the gain medium is also pumped at an output end 19 thereof by a pump laser 22 via a pump signal multiplexer 20. It should be appreciated that the gain medium only has to be pumped at one end, and the pumping at both ends as shown in FIG. 1 is optional.

Any solid-state laser material can be used to provide the gain medium. In a preferred embodiment, an Erbium fiber is used for the gain medium. Fibers doped with other rare earth materials, such as neodymium, can alternatively be used for doped fiber 15. As is well known in the art, a gain medium comprising an Erbium doped fiber can be used with a pump laser operating at either 980 nanometers (nm) or 1480 nm. A neodymium doped fiber will operate with an 807 nm pump laser. The pump signal multiplexers 16, 20 illustrated in FIG. 1 are conventional components well known in the art.

All fiber except the doped fiber 15 illustrated in FIG. 1 is standard 1300 nm or 1500 nm single mode fiber if the pump laser is operating near 1480 nm. If the gain medium is pumped at 980 nm, with an Erbium doped fiber 15, the fibers transporting pump light to the Erbium fiber may be designed for single mode operation at 980 nm.

In accordance with the present invention, a reflector, such as fiber grating 14 is coupled via multiplexer 16 to the input end 17 of doped fiber 15. Fiber grating 14 is a reflection device with a narrow reflection band. For example, reflection grating 14 can be a grating that has a bandwidth of approximately 1 Å for reflecting light at approximately 1550 nm.

Pumping the gain medium with pump laser 18 and/or pump laser 22 will cause spontaneous emission to occur in the gain medium (doped fiber 15) as well known in the art. The spontaneous emission propagating from the gain medium toward reflector 14 will exit the input end 17 of the doped fiber via multiplexer 16. Most of the spontaneous emissions will continue past reflector 14 to optical fiber 12, and will exit the superluminescent source via a conventional slant polish connector 10. In accordance with the present invention, the spontaneous emission in the reflection band of grating 14 that exits input end 17 of doped fiber 15 will be reflected back to the gain medium. The reflected energy within the reflection band will pass back into doped fiber 15 via multiplexer 16.

Upon its return to the gain medium, the reflected energy within the reflection band of reflector 14 will be amplified. Since the gain of a doped fiber is generally on the order of 30 dB or more, this amplification will be substantial. The amplified energy will then be output from the gain medium at its output end 19. The energy output from output end 19 is coupled to an optical isolator 24 to prevent the amplified energy from reflecting back into the doped fiber 15 via multiplexer 20, so that the gain medium does not lase.

After passing through optical isolator 24, the energy exits the superluminescent source at a slant polish connector generally designated 26, for use as an incoherent optical carrier. Prior to inputting the carrier to an external modulator, it can be polarized by a conventional polarizer 28. Some types of external modulators, such as a lithium niobate Mach Zehnder modulator, require polarized light.

The optical carrier produced by the superluminescent source of the present invention comprises high intensity light at a nominal bandwidth of 1 Å. The dispersion of the 1 Å wide light is minimal. Accordingly, the optical carrier is suitable for use with AM-VSB (vestigial sideband) signals, such as standard cable television signals. The carrier will also work well for digital pulse code modulation (PCM) communications, as long as extremely long transmission distances are not required. In order to extend the range of a carrier generated in accordance with the present invention, a number of stages of cascaded doped fiber optical amplifiers can be utilized.

The output power of the superluminescent source at coupler 26 is limited by the pump power of pump laser 18 and/or pump laser 22. Power conversion efficiencies on the order of 95% are achievable after correction for photon quantum efficiency.

Figure 2:
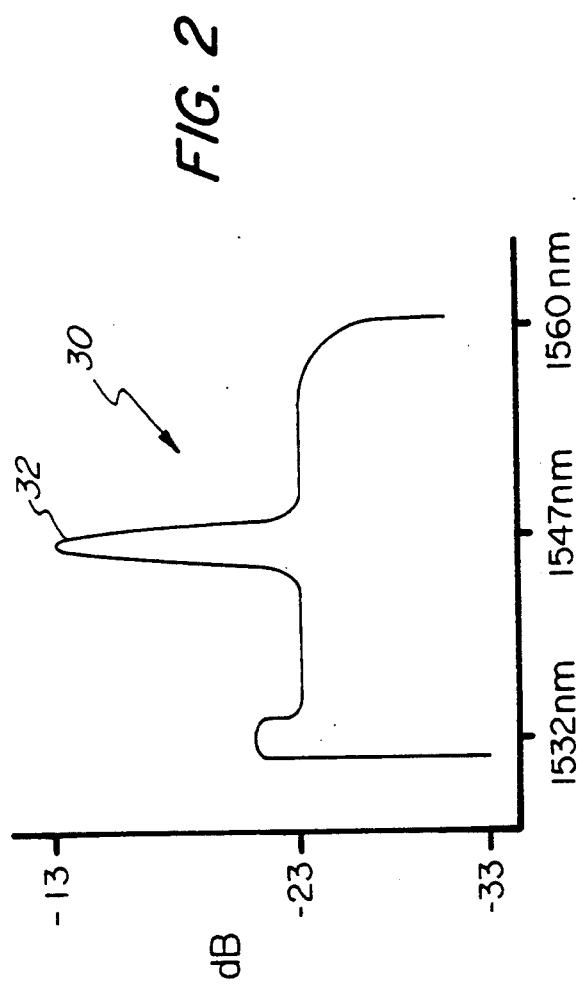
FIG. 2 is a graphical representation of the output of the superluminescent source of FIG. 1.

FIG. 2 illustrates the output of the superluminescent source. The output energy spectrum 30 exhibits a peak 32 at about 1547 nm for an Erbium fiber implementation. Experimental data has shown that the bandwidth of the peak 32 can be designed to be extremely narrow, e.g., on the order of 13 GHz, as compared to previously known superluminescent sources. However, it may be necessary to use a somewhat broader bandwidth to maintain relative intensity noise (RIN) at an acceptable level for optical signal communication. Energy that is about 10 dB down from the peak 32 results from photons outside of the desired band which propagate toward the output end 19 of the gain medium and are amplified therein.

Figure 3:
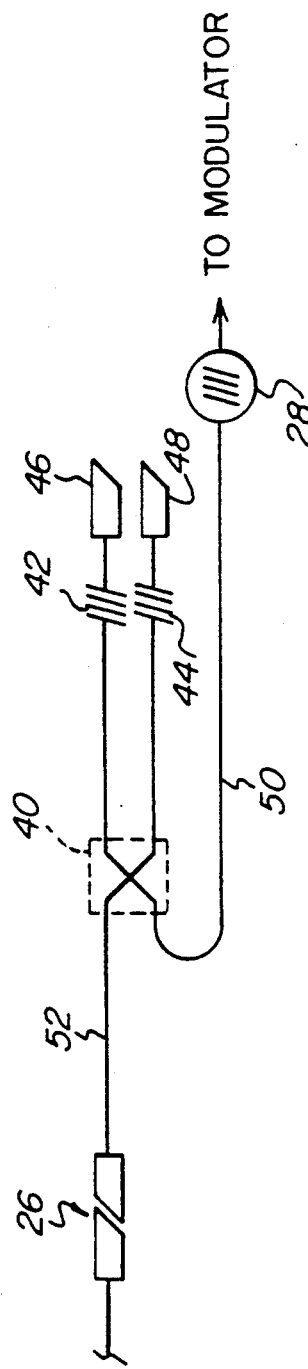
FIG. 3 is a schematic diagram of a filter that can be used to filter the output of the superluminescent source prior to an external modulator.

In order to improve the response of the superluminescent source of FIG. 1, filtering can be provided to filter undesired spontaneous emissions that exit from the output end 19 of the gain medium. A filter such as that illustrated in FIG. 3 can be used to pass only the desired spontaneous emissions in peak 32 of the response curve 30 illustrated in FIG. 2. The filter of FIG. 3 can be inserted between coupler 26 and polarizer 28 of FIG. 1.

The filter is constructed by coupling a pair of gratings 42, 44 to a conventional 2×2 coupler 40. Gratings 42, 44 are matched in reflection band to grating 14 illustrated in FIG. 1. This configuration can be viewed as a balanced resonant Michelson interferometer. Light outside the reflection band of gratings 42, 44 is lost via slant polish connectors 46, 48 respectively. Light within the reflection band is routed to optical fiber 50 because the balanced interferometer provides the desired phase shift for almost 100% transmission from optical fiber 52 to optical fiber 50.

Figure 4:
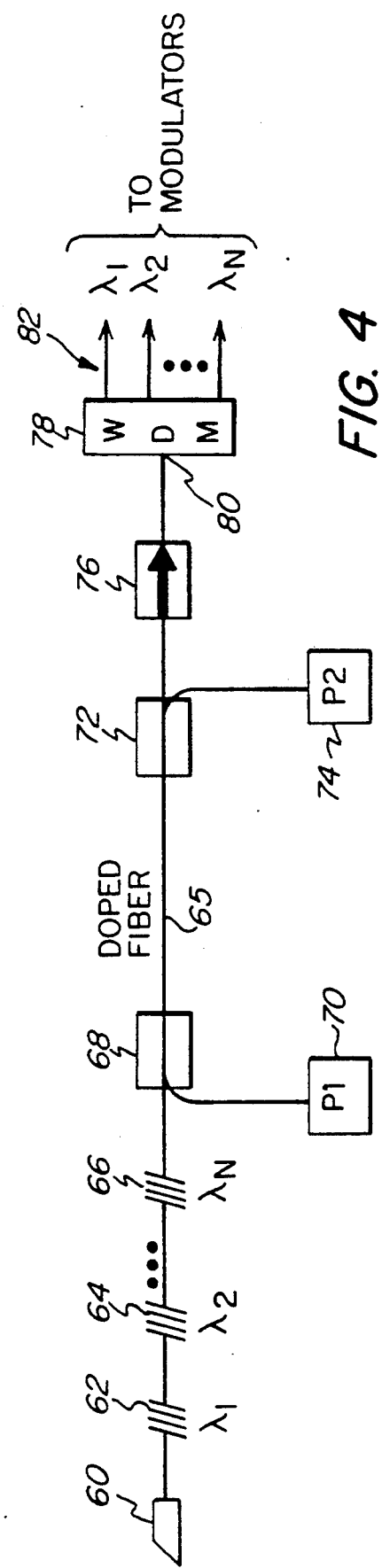
FIG. 4 is a schematic diagram of an alternate embodiment of the superluminescent source in which a plurality of optical carriers are generated.

FIG. 4 illustrates an embodiment of the present invention in which a plurality of optical carriers are generated. The operation of the superluminescent source is the same as that discussed in connection with FIG. 1. However, instead of a single grating 14 as shown in FIG. 1, the embodiment of FIG. 4 includes a plurality of gratings 62, 64, 66, each providing a different reflection band. Spontaneous emissions that are not reflected by reflectors 62, 64, or 66 are lost via slant polish connector 60. The reflected light is input back into doped fiber 65 via multiplexer 68. The doped fiber is pumped at one or both ends by pump lasers 70 and/or 74. Light output from the doped fiber 65 is coupled via multiplexer 72 to an optical isolator 76 that prevents the superluminescent source from lasing. A wavelength division multiplexer 78 is operated in a reverse direction, receiving the energy at its "output" terminal 80 for demultiplexing the individual carriers for output to a plurality of corresponding modulators as indicated at 82.

In the event that the external modulators receiving the carrier signals require polarized light, individual polarizers such as polarizer 28 illustrated in FIG. 1 can be used. Alternatively, the doped fiber 65 can incorporate a polarizer integrally therewith as well known in the art. Another way to provide a polarized output would be to use a highly birefringent doped fiber for the gain medium, e.g., a polarizing Erbium fiber. Such techniques can also be used in the embodiment of FIG. 1 to eliminate the need for a separate polarizer 28.

Those skilled in the art will appreciate that a problem that may be encountered with high power superluminescent sources is excess photon noise. One technique for eliminating such noise is disclosed in P. R. Morkel, R. I. Laming, H. O. Edwards, and D. N. Payne, "Elimination of Excess Photon Noise from Fiber Superradiant Sources", Paper CTUH76, CLEO 90, Anaheim, Calif., May 22, 1990.

It should now be appreciated that the present invention provides a superluminescent source for use in generating narrow band incoherent optical carriers. The superluminescent source includes a gain medium such as an Erbium doped fiber and a reflector for reflecting spontaneous emissions within a predefined band from the gain medium back into the medium for amplification and output. Lasing of the superluminescent source is prevented by an optical isolator coupled to the output thereof. A plurality of different carriers can be generated by the same superluminescent source by providing reflectors to reflect spontaneous emissions having different predefined wavelengths back into the gain medium.

Although the invention has been described in connection with various specific embodiments, those skilled in the art will appreciate that numerous adaptations and modifications may be made thereto, without departing from the spirit and scope of the invention as set forth in the claims.

What is claimed is:

1. A narrow band incoherent optical carrier generator for use in optical communication systems comprising:
   a superluminescent source operating below lasing threshold including a gain medium for generating incoherent spontaneous emission and having an input end and an output end;
   selective reflector means for reflecting energy within a predetermined narrow band; and
   input coupler means for optically coupling the input end of said gain medium to said selective reflector means to cause spontaneous emissions within said predetermined band exiting the input of said gain medium to be reflected back into said gain medium, without reflecting spontaneous emissions outside of said predetermined band back into said medium, thereby producing a narrow band incoherent optical carrier generator.

2. An optical carrier generator in accordance with claim 1 further comprising:
   optical isolator means coupled to the output end of said gain medium for preventing said medium for lasing.

3. An optical carrier generator in accordance with claim 1 wherein said reflector means comprise an optical fiber grating.

4. An optical carrier generator in accordance with claim 3 further comprising:
   means coupled to said grating for causing spontaneous emissions outside of said predetermined band exiting the input of said gain medium to leave the optical carrier generator.

5. An optical carrier generator in accordance with claim 1 wherein said gain medium comprises a pumped doped optical fiber.

6. An optical carrier generator in accordance with claim 5 wherein said doped optical fiber is pumped at both said input and said output ends.

7. An optical carrier generator in accordance with claim 5 wherein said pumped fiber is Erbium doped.

8. An optical carrier generator in accordance with claim 5 further comprising:
   means provided in said doped fiber for polarizing energy produced therein prior to output from said output end.

9. An optical carrier generator in accordance with claim 1 further comprising:
   means coupled to the output end of said gain medium for polarizing energy exiting said output end for input to an external modulator.

10. An optical carrier generator in accordance with claim 1 further comprising:
    filter means coupled to the output end of said gain medium for eliminating spontaneous emissions outside of said predetermined band that exit from said output end.

11. An optical carrier generator in accordance with claim 1 wherein said reflector means comprise:
    a plurality of different reflectors each adapted to reflect spontaneous emissions within a different predetermined narrow band back into said gain medium.

12. An optical carrier generator in accordance with claim 11 further comprising:
    demultiplexer means coupled to the output end of said gain medium for providing a plurality of separate carriers, each having a wavelength within a different one of said bands.

13. An optical carrier generator in accordance with claim 11 wherein said reflector means comprise a plurality of optical fiber gratings.

14. A method for communicating signals over an optical fiber communication path comprising the steps of:
generating an incoherent optical carrier signal in a superluminescent source;
limiting said carrier signal to a narrow bandwidth;
amplifying said limited bandwidth carrier signal within said source; and
modulating said amplified carrier signal with an information signal for communication over said optical fiber communication path.

15. A method in accordance with claim 14 wherein said limiting step comprises the step of:
reflecting spontaneous emissions within said narrow bandwidth that exit an input end of a gain medium of said superluminescent source back into said gain medium;
wherein spontaneous emissions outside of said narrow bandwidth that exit said input end are not reflected back into said gain medium.

16. A method in accordance with claim 15 wherein a plurality of different incoherent optical carriers is generated by reflecting spontaneous emissions within a corresponding plurality of different bands back into the input end of said gain medium without reflecting spontaneous emissions outside of said plurality of bands.

17. A method in accordance with claim 16 comprising the further steps of:

demultiplexing energy exiting an output end of said gain medium to provide individual optical carriers; and
modulating said individual carriers with respective information signals.

18. An optical source comprising:
a rare earth doped optical fiber having an input end and an output end;
means for pumping said doped fiber to cause spontaneous emission therein without exceeding lasing threshold for output from said output end;
selective reflector means for reflecting light over a limited bandwidth encompassing a desired wavelength of said spontaneous emission; and
means for optically coupling the input end of said doped fiber to said selective reflector means to reflect spontaneous emissions within said limited bandwidth exiting the input end of said doped fiber back into said doped fiber for output from said output end, without reflecting light outside of said bandwidth back into said doped fiber, thereby producing a limited bandwidth optical source.

19. An optical source in accordance with claim 18 further comprising:
optical isolator means coupled to the output end of said doped fiber for preventing the fiber from lasing.

20. An optical source in accordance with claim 18 wherein said selective reflector means comprise an optical fiber grating.

21. An optical source in accordance with claim 20 wherein said grating has a bandwidth of approximately 1 angstrom.

* * * * *